(12) United States Patent
Matsukura et al.

(10) Patent No.: US 7,440,761 B2
(45) Date of Patent: Oct. 21, 2008

(54) COMMUNICATION RELAY METHOD AND DEVICE

(75) Inventors: Ryuichi Matsukura, Kawasaki (JP); Hitoshi Yamauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 10/896,881

(22) Filed: Jul. 23, 2004

(65) Prior Publication Data

US 2005/0047364 A1 Mar. 3, 2005

(30) Foreign Application Priority Data

Sep. 3, 2003 (JP) ............................. 2003-311033

(51) Int. Cl.
*H04Q 7/20* (2006.01)
(52) U.S. Cl. .................... 455/452.2; 455/445; 455/450; 455/451; 455/452.1; 455/453; 370/231; 370/235; 370/237; 370/328; 370/338
(58) Field of Classification Search .............. 455/435.1, 455/435.2, 435.3, 434, 452.2, 445, 450, 451, 455/452.1, 453, 464; 370/328, 352, 401, 370/231, 235, 237, 338
See application file for complete search history.

(56) References Cited

U.S. PATENT DOCUMENTS

| | | | |
|---|---|---|---|
| 6,542,491 B1 * | 4/2003 | Tari et al. ..................... | 370/338 |
| 6,839,331 B2 | 1/2005 | Rudnick | |
| 6,952,422 B2 * | 10/2005 | Yamaguchi ................... | 370/401 |
| 6,973,315 B1 * | 12/2005 | Miernik et al. ........... | 455/452.2 |
| 7,058,113 B2 | 6/2006 | Etoh | |
| 7,272,119 B2 | 9/2007 | Rudnick et al. | |
| 2002/0058480 A1 * | 5/2002 | Ikeda ........................ | 455/67.1 |
| 2002/0130171 A1 | 9/2002 | Rudnick | |

(Continued)

FOREIGN PATENT DOCUMENTS

EP 1237334 A2 9/2002

(Continued)

OTHER PUBLICATIONS

Matsukura, Ryuichi, et al., "A Priority Control Method for High Quality VoIP Systems over Wireless LAN", Technical Report of IEICE, CQ2003-48, Aug. 28, 2003, pp. 37-42.

(Continued)

*Primary Examiner*—Vincent P. Harper
*Assistant Examiner*—Khai M Nguyen
(74) *Attorney, Agent, or Firm*—Staas & Halsey LLP

(57) ABSTRACT

A wireless communication system including
a wireless relay station storing a priority table in which identifiers of the communications that are relayed with higher priority are registered,
a wireless relay device relaying communications specified by the communication identifiers registered in the priority table with higher priority than other communications,
a stream server receiving communication start requests from any of the wireless terminals and sends to the wireless relay station communication identifiers specifying the communications that are about to be started, and requests registration in the priority table, and
a wireless relay station registering the communication identifiers whose registration has been requested in the priority table, such that a proportion S/U of a sum S of consumption bandwidths of the communications specified by communication identifiers registered in the priority table to the available bandwidth U of the wireless network does not exceed a predetermined upper limit.

9 Claims, 14 Drawing Sheets

Overall Configuration

U.S. PATENT DOCUMENTS

| | | |
|---|---|---|
| 2002/0131371 A1 | 9/2002 | Rudnick |
| 2002/0159418 A1 | 10/2002 | Rudnick et al. |
| 2002/0163928 A1 | 11/2002 | Rudnick et al. |
| 2002/0165989 A1 | 11/2002 | Etoh |
| 2003/0021405 A1* | 1/2003 | Durland et al. ............. 379/243 |
| 2004/0034683 A1* | 2/2004 | Zhao ......................... 709/201 |
| 2006/0203890 A1 | 9/2006 | Etoh |
| 2006/0224755 A1 | 10/2006 | Etoh |

FOREIGN PATENT DOCUMENTS

| | | |
|---|---|---|
| EP | 1237334 A3 | 10/2003 |
| EP | 1237334 B1 | 4/2006 |
| JP | 63-133736 | 6/1988 |
| JP | 07-131465 | 5/1995 |
| JP | 08-107417 | 4/1996 |
| JP | 09-069834 | 3/1997 |
| JP | 2000-253017 | 9/2000 |
| JP | 2002-314546 | 10/2002 |
| JP | 2002-330138 | 11/2002 |
| JP | 2003-110575 | 4/2003 |
| JP | 2003-134077 | 5/2003 |

OTHER PUBLICATIONS

Communication form the Japanese Patent Office dated Oct. 2, 2007.
"Spectral Voice Priority", (2003) /KN/ http://www.spectralink.com/files/literature/SVP_white_paper.pdf.
"Cisco IP Telephony Qos Design Guide", http://www.cisco.com/japanese/warp/public/3/jp/service/manual_j/ipts/citdg/chapter01/11549_01_1.PDF. Nov. 26, 2002 /Kn/.
"Improvement of Transmission Delay for Voice over IP in Wireless LAN", The Institute of Electronics, Information and Communication Engineers, Proceeding of the 2001 IEICE General Conference, Communication 1, p. 716.
"A study of Traffic Control for VoIP", The Institute of Eletronics, Information and Communication Engineers, Proceeding of the 2001 IEICE General Conference, Communication 1, p. 186.
U.S. Appl. No. 12/068,352, filed Feb. 05, 2008, Matsukura et al.
Communication form the Japanese Patent Office mailed on May, 27, 2008 in corresponding Japanese patent application No. 2003-311033.

* cited by examiner

112

| | sender | | receiver | | state |
|---|---|---|---|---|---|
| | IP address | port address | IP address | port address | |
| 1 | * (anything) | * | 192.168.1.5 | 5060 | communicating |
| 2 | 192.168.1.5 | 5060 | * | * | communicating |
| 3 | | | | | |
| 4 | | | | | |
| 5 | | | | | |

| | sender | | receiver | | consumption bandwidth | state |
|---|---|---|---|---|---|---|
| | IP address | port address | IP address | port address | | |
| 1 | 192.174.5.8 | 16384 | 194.4.19.19 | 16390 | 16kbps | communicating |
| 2 | 198.174.5.10 | 16388 | 112.98.14.31 | 16386 | 128kbps | disconnected |
| 3 | | | | | | |
| 4 | | | | | | |
| 5 | | | | | | |

Fig. 7

|   | sender | | receiver | | consumption bandwidth | state |
|---|---|---|---|---|---|---|
|   | IP address | port address | IP address | port address | | |
| 1 | *(anything) | * | 192.168.1.5 | 5060 | 1kbps | communicating |
| 2 | 192.168.1.5 | 5060 | * | * | 1kbps | communicating |
| 3 | 192.174.5.8 | 16384 | 194.4.19.19 | 16390 | 16kbps | communicating |
| 4 | 198.174.5.10 | 16388 | 112.98.14.31 | 16386 | 128kbps | disconnected |
| 5 | | | | | | |

*Fig. 8*

|   | sender | | receiver | | state |
|---|---|---|---|---|---|
|   | IP address | port address | IP address | port address | |
| 1 | 192.174.5.8 | 16384 | 194.4.19.19 | 16390 | communicating |
| 2 | 198.174.5.10 | 16388 | 112.98.14.31 | 16386 | communicating |
| 3 | | | | | |
| 4 | | | | | |
| 5 | | | | | |
| A | 198.174.65.10 | 16398 | 112.98.15.31 | 16396 | disconnected |
| B | | | | | |
| C | | | | | |

Rows 1–5: entries for existing parties
Rows A–C: entries for guests

|   | wireless terminal IP address | wireless relay station IP address |
|---|---|---|
| 1 | 192.174.5.8 | 114.168.1.100 |
| 2 | 194.4.19.19 | 114.168.1.10 |
| 3 | | |
| 4 | | |
| 5 | | |
| 6 | | |
| 7 | | |

COMMUNICATION RELAY METHOD AND DEVICE

FIELD OF THE INVENTION

The present invention relates to communication schemes in which a plurality of users belonging to the same communication area share a limited communication bandwidth, as in a wireless LAN (local area network). More specifically, the present invention relates to such communication schemes, wherein degrees of priority are assigned to each of the communications of the plurality of users, and the quality of communications with a high degree of priority is ensured.

BACKGROUND ART

In wireless data communication systems, such as wireless LANs, the same data reaches wireless terminals that are present within an area receiving the radio waves from a wireless relay station. That is to say, communication data between the wireless relay station and a given wireless terminal is simultaneously communicated to the other terminals as well. Consequently, it is not possible that a plurality of wireless terminals simultaneously perform communication completely independently from one another. Therefore, when one wireless terminal starts to send a large amount of data, the other wireless terminals will be influenced by this communication. For example, effects such as a slow-down of the communication speed or delays in the response may occur. In VoIP (voice over IP) technology, which is used in IP (internet protocol) telephones, audio data is communicated at predetermined intervals between a wireless relay station and a wireless terminal. In this situation, when a communication necessitating a lot of communication bandwidth is started by another wireless terminal, the audio data being communicated may arrive at a certain delay. As a result, the audio of the communication partner may be reproduced at a delay, or a cut-off noise or the like may occur when the reproduction of the audio data occurs too late. For this reason, there is a need for assigning priorities to certain communications when a plurality of communications are carried out. The following is an explanation of methods for priority control that have been proposed up to now.

IEEE 802.11 is an international standard for wireless LANs. There are several standards, depending on differences in the radio bands and the modulation method used. For example, the standard for wireless LANs that are presently in wide use is IEEE 802.11b, which allows communication at a maximum of 11 Mbps in the 2.4 GHz band. This wireless LAN standard has two communication modes.

One communication mode is a mode called DCF (distributed coordination function). In this mode, when no communication is performed, a wireless terminal that wants to send data can send the data. When a plurality of wireless terminals attempt to send data simultaneously, there is the possibility of conflict among these communications, so that in the period after the previous communication has finished and until the next communication starts, the standard mandates that each wireless terminal performs the sending of data after waiting for a random standby time (referred to as "backoff time" below). Therefore, when there are a plurality of wireless terminals, the wireless terminals are each given an equal opportunity to transmit, and no priority is given to any of the wireless terminals.

Another communication mode is the mode referred to as PCF (point coordination function). In this mode, the wireless relay station can intentionally secure the communication bandwidth for certain wireless terminals periodically. However, currently available wireless LAN systems do not support the PCF mode, and at present, priority control in wireless LANs is not performed by a standardized method.

Recently, EDCF (enhanced DCF), which is an expansion of DCF, has been considered as a part of the 802.11e standard. Whereas DCF provides only one send queue, EDCF provides a maximum of eight send queues. It has been proposed to differentiate these send queues in accordance with the priority degree of the communication data. With such a scheme, when send data is stored in send queues with different degrees of priority, then the backoff times are set shorter for queues with higher degrees of priority. Therefore, data with a high degree of priority is more likely to be sent.

Another proposal has been to prioritize certain communications by intentionally shortening the time that has to be waited after other communication has finished, when communicating in the DCF mode. This communication scheme operates without waiting for the backoff time that is stipulated in the aforementioned 802.11 standard, but compatibility is preserved, because it operates without problems even when operating simultaneously with devices conforming to the 802.11 standard. However, as the number of wireless terminals operating in this manner is increased, there is the danger that the probability for contention rises, and the communication quality decreases. Consequently, this scheme is useful only when the number of prioritized communication terminals is small.

The above-described prioritization methods are all methods performing the priority control separately for each wireless terminal, that is, separately for each communication. By contrast, the following methods, for example, are methods in which the priority control is performed depending on the data type to be communicated:

(a) Method using the value set for the layer-2 service class (COS) in the user priority bits stipulated under 802.1Q;
(b) Method using IP priority order/DSCP (differential service code bit) in the type-of-service (TOS) byte of the IPv4 header.

Both COS and TOS consist of three bits. It is possible to prioritize the packets of a specific data type by determining a common packet priority order and referencing this information with the wireless terminals or the data relay device. At present, as IP telephone equipment is developed, this approach is adopted most often. However, in general there are only few devices that utilize this information, and there is the risk that difficulties arise when mixing different services. There is furthermore the possibility that the entire network is put at risk when there are terminals with which an application operating on wireless terminals and wired terminals is intentionally set to incorrect settings in order to ensure a high priority degree.

Furthermore, JP 2003-134077A describes a method for sending videos with MPEG video encoding, in which an MPEG header is referenced and data is distributed over a plurality of queues with different priority degrees. However, the algorithm for referencing the header and distribution to the queues is fixed, so that it is difficult to dynamically change the method of the priority control.

As described above, several methods for performing priority control on a wireless LAN have been proposed. However, ordinarily the communication bandwidth of wireless LANs is narrower than that of wired networks. For this reason, even when priority control is performed, it is conceivable that most of the available bandwidth of the wireless network is used up by prioritized communication. In this case, there is the possibility that it is not possible to preserve the communication quality of prioritized communication, even when performing priority control, due to the influence that prioritized communications have on one another on a crowded network.

In order to perform stream communication as in VoIP over a wireless LAN, periodic communication must be realized reliably. There are the following four problems regarding this:
(1) Priority control in wireless communication zones;
(2) Distribution of prioritized packets at wireless terminals and relay device;
(3) Optimization of the method for determining which communication should be prioritized;
(4) Bandwidth management of prioritized communication at the wireless relay station.

Of these problems, problem (1) is realized by the above-described methods. Regarding the problems (2) and (3), it is desirable that it is possible to switch flexibly, in accordance with the actual needs, for example between priority control at the wireless terminal level, priority control at the application level or priority control according to data type. For example, it is preferable to give priority to IP telephony over internet radio audio streams, even though both are streamed audio. Moreover, it is desirable to enable settings that give priority to IP phone calls by customers who pay for charge over IP phone calls by customers who don't pay.

As for problem (4), there is a limitation on the bandwidth that can be used by wireless terminals performing prioritized communication, so that one problem that arises is how conflicts among prioritized communications can be solved. Moreover, in wireless LANs, when the state of the wireless communication between the wireless terminals and the wireless relay station becomes poor and errors become frequent, then a function is activated that reduces the connection speed to maintain the communication quality. When the connection speed is lowered and the transferred data amount per unit time is kept the same, then the consumption bandwidth is effectively broadened. Thus, it becomes necessary to monitor the connection speed in the bandwidth management.

Furthermore, when there are a plurality of wireless relay stations, it may occur that a wireless terminal is switched automatically, as a result of being moved, from a wireless relay station to which it was connected previously to another nearby wireless relay station. In this case, it is expected that the prioritized communication that was already realized continues seamlessly even after the switch to another relay station. Therefore, it is necessary to reserve a certain communication bandwidth at the wireless relay station to which a wireless terminal is moved from another wireless relay station. All of the above problems need to be considered for the bandwidth management of prioritized communications.

It is an object of the present invention to realize stable wireless communication by priority control of the communication of wireless terminals.

SUMMARY OF THE INVENTION

According to a first aspect of the present invention, a communication relay method executed by a wireless communication system comprising a plurality of wireless terminals, a relay device connected by a wireless network to the wireless terminals, and a communication managing device connected to the relay device by a wired network, comprises steps of:

storing, in the relay device, a priority table in which identifiers of communications relayed with higher priority are registered;

relaying, by the relay device, communication specified by the communication identifiers stored in the priority table with higher priority than other communication;

receiving, by the communication managing device, communication start requests from any of the wireless terminals and sending communication identifiers specifying the communications that are about to be started to the relay device;

receiving, by the relay device, the communication identifiers and registering the received communication identifiers in the priority table, to an extent that a proportion S/U of a sum S of consumption bandwidths of the communications specified by the communication identifiers registered in the priority table to the available bandwidth U of the wireless network does not exceed a predetermined upper limit.

Using this communication relay method, communications that are registered in the priority table are relayed with higher priority. Which communications are handled with higher priority depends on which communications are registered in the priority table. The registration of communications in the priority table is performed in accordance with a request of the communication managing device. Let us consider, for example, the case that the communication managing device is a SIP server managing VoIP telephone communication. In this case, of all the communications performed by the wireless terminal, only VoIP communications are registered by the SIP server in the priority table. As a result, when the wireless terminal is performing a plurality of communications, only the VoIP communications among those are relayed with higher priority. That is to say, the priority control of which communications are prioritized is not carried out within the wireless system including the relay device and the wireless terminals, but substantially by a communication managing device that is arranged outside. Thus, there is the advantage that the method of the priority control can be flexibly changed, in accordance with the circumstances.

It should be noted that when the priority table is full, then the data of VoIP communications that could not be registered may be subjected to such processing as not being relayed at all or being relayed without priority. Data for communication other than VoIP communication is not managed by the SIP server, so that it cannot be registered in the priority table and consequently is not relayed with higher priority.

According to a second aspect of the present invention, in the communication relay method according to the first aspect, the relay device registers communication identifiers in the priority table to an extent that the number of communications specified by the communication identifiers registered in the priority table is not greater than a predetermined number of connections.

Let us consider, for example, the case that VoIP communication is relayed with higher priority in a wireless communication system in accordance with IEEE 802.11b. The available bandwidth of the wireless network shared by the wireless terminals is 11 Mbps. Of this bandwidth, let 6.5 Mbps be reserved as the communication bandwidth for VoIP communication, and let the transfer data amount per unit of time for VoIP communication be 128 kbps. Thus, the maximum connection number that can be allowed for prioritized communication becomes 50. Consequently, 50 communications can be registered in the priority table.

According to a third aspect of the present invention, in the communication relay method according to the first aspect, the relay device registers communication identifiers in the priority table to an extent that the sum of the consumption bandwidths of the communications specified by the communication identifiers registered in the priority table is not greater than an available bandwidth of the wireless network.

Let us consider, for example, the case that VoIP communication is relayed with higher priority in a wireless communication system in accordance with IEEE 802.11b. The available bandwidth of the wireless network shared by the wireless terminals is 11 Mbps. Of this bandwidth, 6.5 Mbps are reserved as the communication bandwidth for VoIP communication, and the consumption bandwidth of each of the wireless terminals is registered in the priority table. The relay device controls the registration in the priority table such that the sum of the consumption bandwidths of the wireless terminals does not exceed 6.5 Mbps.

According to a fourth aspect of the present invention, in the communication relay method according to the first aspect, the relay device reserves, in the priority table, entries for guests in order to take over a relay of prioritized communication data that has been relayed by another relay device.

Wireless communication systems ordinarily include a plurality of relay devices. Thus, it occurs that the relay device to which a wireless terminal is wirelessly connected changes due to the movement of the wireless terminal. Accordingly, the relay devices reserve a provisional communication bandwidth as resources for guests. Thus, even when the priority communication bandwidth for existing terminals in the priority table of a given relay device is fully utilized, the communication of the wireless terminals that have moved to that relay device can be relayed seamlessly with higher priority.

According to a fifth aspect of the present invention, in the communication relay method according to the fourth aspect, the relay device exchanges with another relay device communication identifiers specifying communication data relayed with higher priority, and updates the priority table based on a result of this exchange.

As the wireless terminal moves, the communication identifier listed in the priority table of the relay device of the original location is sent to the priority table of the relay device of the destination location. A new communication identifier is registered in the guest entries of the priority table of the destination location, and the communication identifier is deleted from the entries for existing terminals in the priority table of the original location. The priority tables are updated as the wireless terminal moves, so that the bandwidth for prioritized communication in the relay devices can be used advantageously.

According to a sixth aspect of the present invention, a communication relay system comprises:

a relay device connected by a wireless network to a plurality of wireless terminals; and a communication managing device connected by a wired network to the relay device;

wherein the relay device comprises:

a priority table storing, from among a plurality of communications by wireless terminals, identifiers of those communications that are relayed with higher priority;

a relay means for relaying communication specified by the communication identifiers stored in the priority table with higher priority than other communication; and a table managing means for receiving communication identifiers from the communication managing device, and registering received communication identifiers in the priority table, to an extent that a proportion S/U of a sum S of consumption bandwidths of the communications specified by the communication identifiers registered in the priority table to the available bandwidth U of the wireless network does not exceed a predetermined upper limit;

wherein the communication managing device receives communication start requests from any of the wireless terminals and sends to the relay device communication identifiers specifying the communication that are about to be started.

This system executes the communication relay method according to the first aspect of the present invention.

According to a seventh aspect of the present invention, a communication managing device connected by a wired network to a relay device that is connected by a wireless network to a plurality of wireless terminals, the communication managing device comprising:

a requesting means for receiving communication start requests from any of the wireless terminals and sending to the relay device an identifier of the communications that are about to be started and requests for prioritized relay of these communications;

a receiving means for receiving from the relay device responses to these requests; and a notification means for sending notifications to the wireless terminals depending on the content of the response.

This device functions as a communication managing device in the wireless system according to the first aspect of the present invention.

According to an eighth aspect of the present invention, a relay device connected by a wireless network to a plurality of wireless terminals, comprises:

a connection means for connecting via a wired network to a communication managing device managing communication of the wireless terminals;

a storage means for storing a priority table in which identifiers of communications relayed with higher priority are registered;

a priority relay means for relaying communication data specified by the communication identifiers stored in the priority table with higher priority than other communication;

a request receiving means for receiving from the communication managing device requests to register a communication identifier in the priority table; and a priority table updating means for registering the received communication identifiers in the priority table, to an extent that a proportion S/U of a sum S of consumption bandwidths of the communications specified by the communication identifiers registered in the priority table to the available bandwidth U of the wireless network does not exceed a predetermined upper limit.

This device functions as a relay device in the wireless system according to the first aspect of the present invention.

In accordance with the present invention, which communications are prioritized can be changed flexibly according to needs. Moreover, it possible to prevent a deterioration of the quality of prioritized communication due to conflicts among prioritized communications.

BRIEF DESCRIPTION OF THE DRAWINGS

FIG. 6 is a schematic illustration of the signal administration table shown in FIG. 5.

FIG. 7 is a schematic diagram of the priority table shown in FIG. 5.

FIG. 8 shows an administration table in which the priority table and the signal administration table of a second embodiment have been combined.

FIG. 11 is a schematic diagram illustrating the priority table shown in FIG. 9.

FIG. 12 is a schematic diagram illustrating the connection administration table shown in FIG. 9.

DESCRIPTION OF THE PREFERRED EMBODIMENTS

Overview of the Invention

Figure 1:
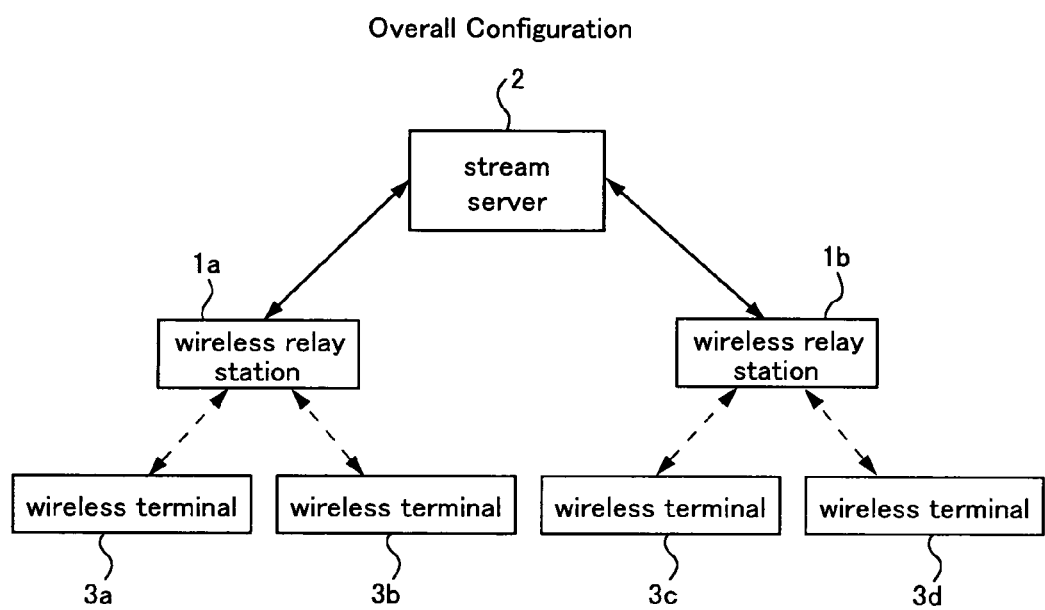
FIG. 1 is a diagram showing the overall configuration of a wireless communication system according to a first embodiment.

According to an embodiment of the present invention, in an ordinary wireless communication system, such as a wireless LAN or the like, priority control is substantially carried out not within the system but outside of the system. Ordinary wireless communication systems include a plurality of wireless terminals and a wireless relay station (corresponding to a "relay device") connected through a wireless network to the wireless terminals. In an embodiment of the present invention, a stream server (corresponding to a "communication managing device") managing the communication performed by the wireless terminals is further added to the wireless communication system. A wireless communication system configured like this performs priority control of communication in the following manner:

(a) The wireless relay station stores, from among the communications managed by the stream server, the identifiers of those communications that are relayed with higher priority in a priority table.

(b) The wireless relay station relays the communications specified by the communication identifiers registered in the priority table with higher priority than other communications.

(c) The stream server receives a communication start request from any of the wireless terminals, and sends a communication identifier specifying the communication to be started to the wireless relay station, requesting registration in the priority table.

(d) The wireless relay station registers the communication identifier for which registration is requested in the priority table, to an extent that a proportion S/U of a sum S of a consumption bandwidth of communication specified by communication identifiers registered in the priority table to the available bandwidth U of the wireless network does not exceed a predetermined upper limit.

Using this communication relay method, the communications registered in the priority table are relayed with higher priority. Communications relayed with higher priority are also referred to as "prioritized communications" in the following. An upper limit is set in advance for the bandwidth, within the available bandwidth of the wireless network, that is assigned for prioritized communications (also referred to as "resources for prioritized communication" in the following). Which communications are prioritized communications is determined according to which communications are registered in the priority table. The registration of communications in the priority table is performed in accordance with requests by the stream server. The stream server manages the communication of the wireless terminals, and may request that all these communications are handled as prioritized communications. Conversely, the stream sever may also request from the wireless relay station that only a portion of the communications handled by the stream server are handled as prioritized communications.

That is to say, which communications are prioritized is not decided in advance within an ordinary wireless system including a wireless relay station and wireless terminals, but is substantially determined by a stream server outside the system. Therefore, there is the advantage that wireless terminals and applications eligible for prioritized communication can be flexibly set in accordance with various external conditions. Moreover, the registrations of prioritized communications in the priority table are restricted such that the upper limit for resources for prioritized communication is not exceeded, so that the quality of prioritized can be ensured.

It should be noted that there are cases in which no resources for prioritized communication are available, regardless of whether the stream server has requested registration or not. Thus, when the priority table is full, then the communications that could not be registered may be subjected to such processing as not being relayed at all by the wireless relay station or being relayed without priority. For example, if the application is an IP telephone and a call from a wireless terminal is not relayed by the wireless relay station, then the user may be notified that the called IP phone is busy or out of range. Since the stream server is not concerned with communications that are not handled by the stream server, they cannot be registered in the priority table. Consequently, they are not relayed with higher priority.

First Embodiment (1) Configuration

FIG. 1 shows the overall configuration of a wireless communication system according to a first embodiment. The wireless communication system includes at least one wireless relay station 1a, 1b, a stream server 2, and a plurality of wireless terminals 3a to 3d. The functional configurations of the wireless relay stations and the wireless terminals are the same, and unless it is necessary to differentiate between them, they are referred to without the letters a, b, etc.

The wireless terminals 3 can be connected via a wireless LAN to any of the wireless relay stations 1. The wireless stations 1 are connected to one another by a wired LAN 4 (see FIG. 2). Furthermore, the wireless relay stations 1 are connected via a wired LAN 4 to a stream server 2.

The stream server 2 handles all or a portion of the wireless communication of the wireless terminals 3, and uses communication identifiers to discriminate the various communications to be handled. An example of the stream server 2 and the communication handled by the stream server 2 is communication handled by an SIP server. Another example is communication handled by an authentication server. However, the stream server 2 is not limited to these examples.

Figure 2:
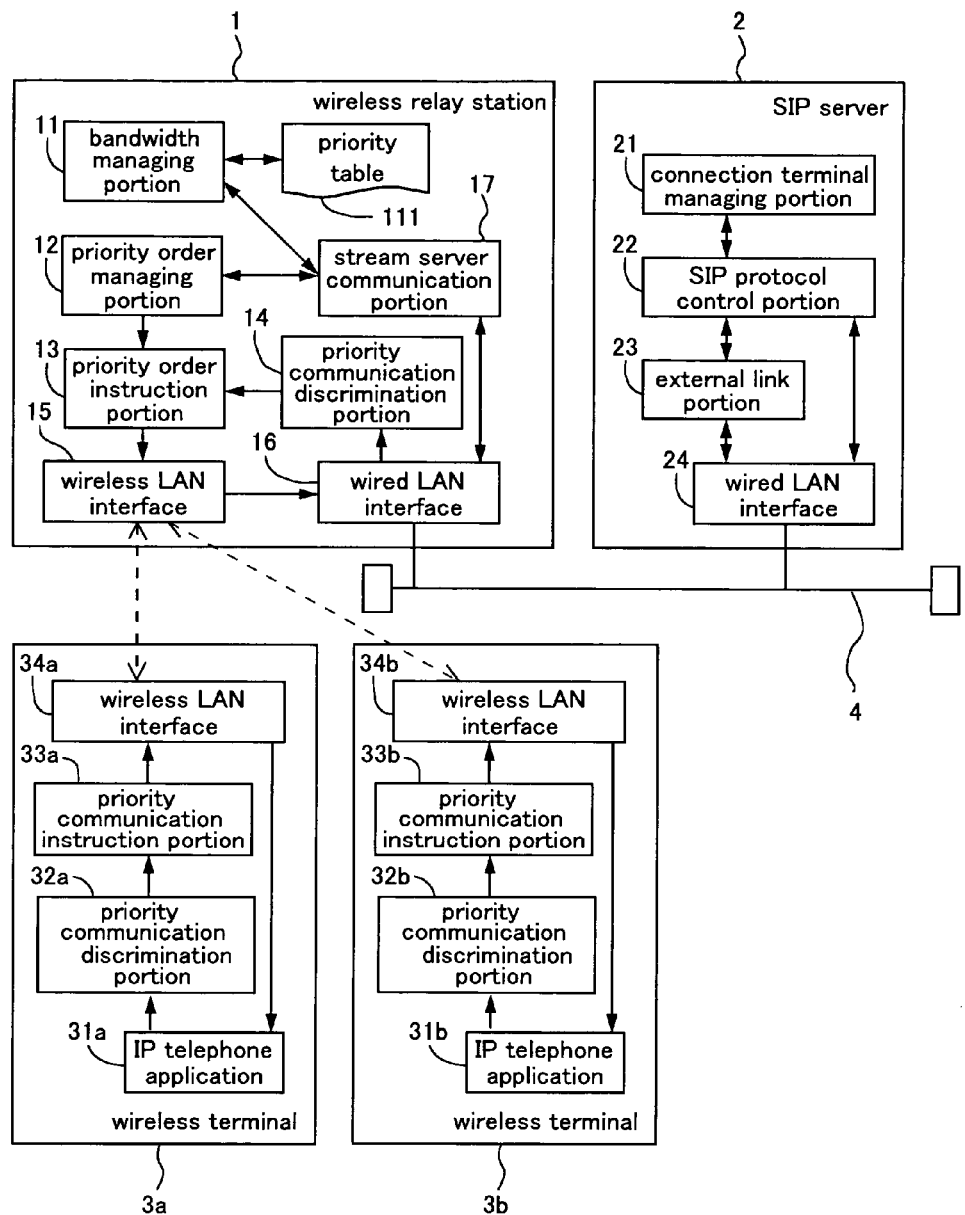
FIG. 2 is a functional diagram of the case that the wireless communication system shown in FIG. 1 is applied to a wireless LAN.

FIG. 2 is a functional diagram of the case that the wireless communication system shown in FIG. 1 is applied to a wireless LAN. In the following, to keep explanations simple, an example is explained in which an SIP server 2 is used as the stream server, and VoIP communication is relayed with higher priority.

Wireless Relay Station

The following is a description of the elements of the wireless relay stations 1. The function of the elements of each of the wireless relay stations 1 is the same, so that unless it is necessary to differentiate between them, they are referred to without the letters a, b, etc.

(a) Bandwidth managing portion 11: The bandwidth managing portion 11 manages a priority table 111. In the priority table 111, communication identifiers for identifying prioritized communications are registered. The bandwidth managing portion 11 updates the priority table 111 in response to messages from the SIP server 2. A more detailed explanation of the priority table 111 is given further below.

(b) Priority order managing portion 12: The priority order managing portion 12 manages the priority order of the prioritized communications registered in the priority table 111. More specifically, the priority order managing portion 12 ordinarily determines the priority order in the order of arrival, and when a plurality of prioritized communications occur at the same time, it also determines which is to be given priority. However, if a PCF or other relay station performing central control of the communication of the wireless terminals is arranged between the wireless terminals 3 and the wireless relay station 1, then it is necessary to manage the priority order of the wireless terminals 3. If there are no particular problems, it is possible to set the priority order to the order in which entries are made in the priority table.

(c) Priority order instruction portion 13: The priority order instruction portion 13 gives instructions to the wireless LAN interface 15, such that the prioritized communications are processed in accordance with the priority order.

(d) Priority communication discrimination portion 14: The priority communication discrimination portion 14 discriminates whether communication data received through a wired LAN interface 16 (explained below) is data for a prioritized communication or not. This judgment is made by looking up whether the communication identifier of the received data is stored in the priority table 111 or not.

(e) Wireless LAN interface 15: The wireless LAN interface 15 performs the access control in accordance with the standard for wireless LANs. Moreover, the wireless LAN interface 15 relays the communications registered in the priority table 111 with higher priority than the non-prioritized communication in the wireless zone, in accordance with the priority order specified by the priority order instruction portion 13. For the method for relaying with higher priority, any of the methods proposed in the conventional art can be utilized. For example, it is possible to use a priority communication scheme as discussed for standardization in accordance with IEEE 802.11e.

(f) Wired LAN interface 16: The wired LAN interface 16 performs the access control in accordance with the standard for wired LANs.

(g) Stream Server communication portion 17: The stream server communication portion 17 exchanges data with the SIP server 2 through the wired LAN interface 16.

Figure 3:
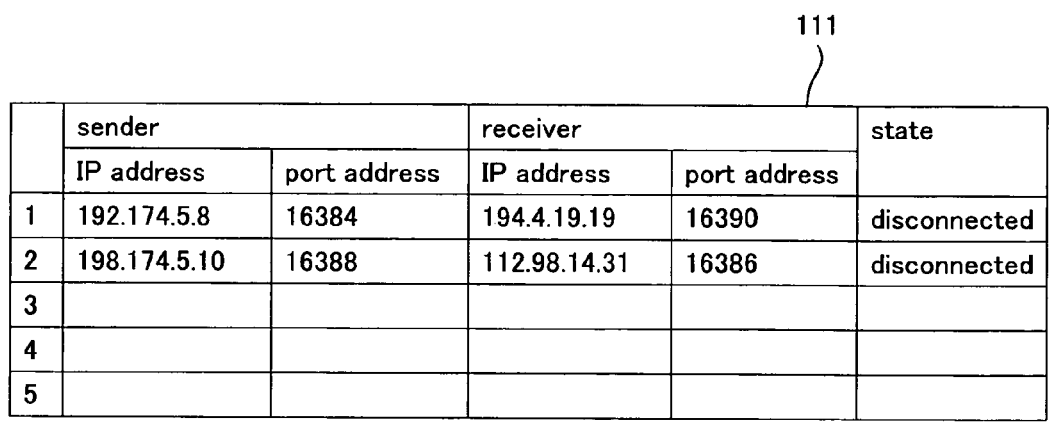
FIG. 3 is a schematic illustration of the priority table shown in FIG. 2.

FIG. 3 is a schematic illustration of the priority table 111. The priority table 111 registers communication identifiers and communication states of prioritized communications. The IP addresses and port numbers of the sender and the receiver are used as the communication identifiers. Whether a communication identifier is registered in the priority table 111 is decided by whether the following expression is satisfied:

$$S/U \leq (\text{predetermined upper limit})$$

where S: sum of the consumption bandwidth of communications registered in the priority table 111;

U: available bandwidth U of the wireless LAN shared by the plurality of wireless terminals 3.

The available bandwidth of the wireless LAN that is determined by this upper limit constitutes the resources for prioritized communication. In this example, the number of entries in the priority table 111 are determined, and if there are empty entries, it is judged that resources for prioritized communication are available. The number of entries can be decided as described below.

For example, let us consider the case that VoIP communication is relayed with higher priority in a wireless LAN system in accordance with IEEE 802.11b. The available bandwidth of the wireless LAN shared by the wireless terminals 3 is 11 Mbps. Of this bandwidth, 6.5 Mbps are reserved as the communication bandwidth for VoIP communication, that is, as the resources for prioritized communication. The transfer data amount per unit of time for VoIP communication with the wireless terminals 3 is assumed to be 64 kbps×2=128 kbps, in consideration of two-way sending and receiving. Thus, the maximum connection number that can be allowed for prioritized communication is given by 6.5M/128 k, and is thus 50. Consequently, 50 entries should be generated in the priority table 111. Thus, a maximum of 50 prioritized communications can be registered in the priority table 111.

SIP Server

The SIP server 2 has the following elements:

(a) Connection terminal managing portion 21: The connection terminal managing portion 21 stores the communication identifiers identifying the communications handled by the SIP server 2. Examples of communication identifiers are the IP addresses and port numbers of the sender and the receiver of a data stream.

(b) SIP protocol control portion 22: The SIP protocol control portion 22 controls the communication data that is exchanged with the wireless LAN interface 24, which is VoIP communication data in this example, based on the SIP protocol.

(c) External link portion 23: The external link portion 23 requests prioritized communication from the wireless relay station 1.

(d) Wired LAN interface 24: The wired LAN interface 24 performs access control in accordance with the standard for wired LANs.

Wireless Terminals

The following is a description of the elements of the wireless terminals 3. The function of the elements of each of the wireless relay stations 1 is the same, so that unless it is necessary to differentiate between them, they are referred to without the letters a, b, etc.

(a) IP telephone application 31: The IP telephone application 31 performs access control in accordance with the standard for VoIP telephony.

(b) Priority communication discrimination portion 32: The priority communication discrimination portion 32 discriminates which of the communications carried out by the wireless terminals 3 are prioritized communications. This judgment can be performed as follows. For VoIP communication carried out by wireless terminals, the IP address and (if necessary) the port number of the other communication party are stored (not shown in the drawings). When the VoIP communication starts, a message indicating whether the beginning communication is a prioritized communication is received from the SIP server 2 and stored (not shown in the drawings). Based on the stored information, the send data are passed on to the priority communication instruction portion 33 while differentiating the send data according to prioritized communication and non-prioritized communication.

(c) Priority communication instruction portion 33: The priority communication instruction portion 33 passes the send data on to the wireless LAN interface 34. When doing so, the priority communication instruction portion 33 indicates whether the data are for prioritized communication or non-prioritized communication.

(d) Wireless LAN interface 34: The wireless LAN interface 34 performs access control in accordance with the standard for wireless LANs.

(2) Process Flow

Figure 4:
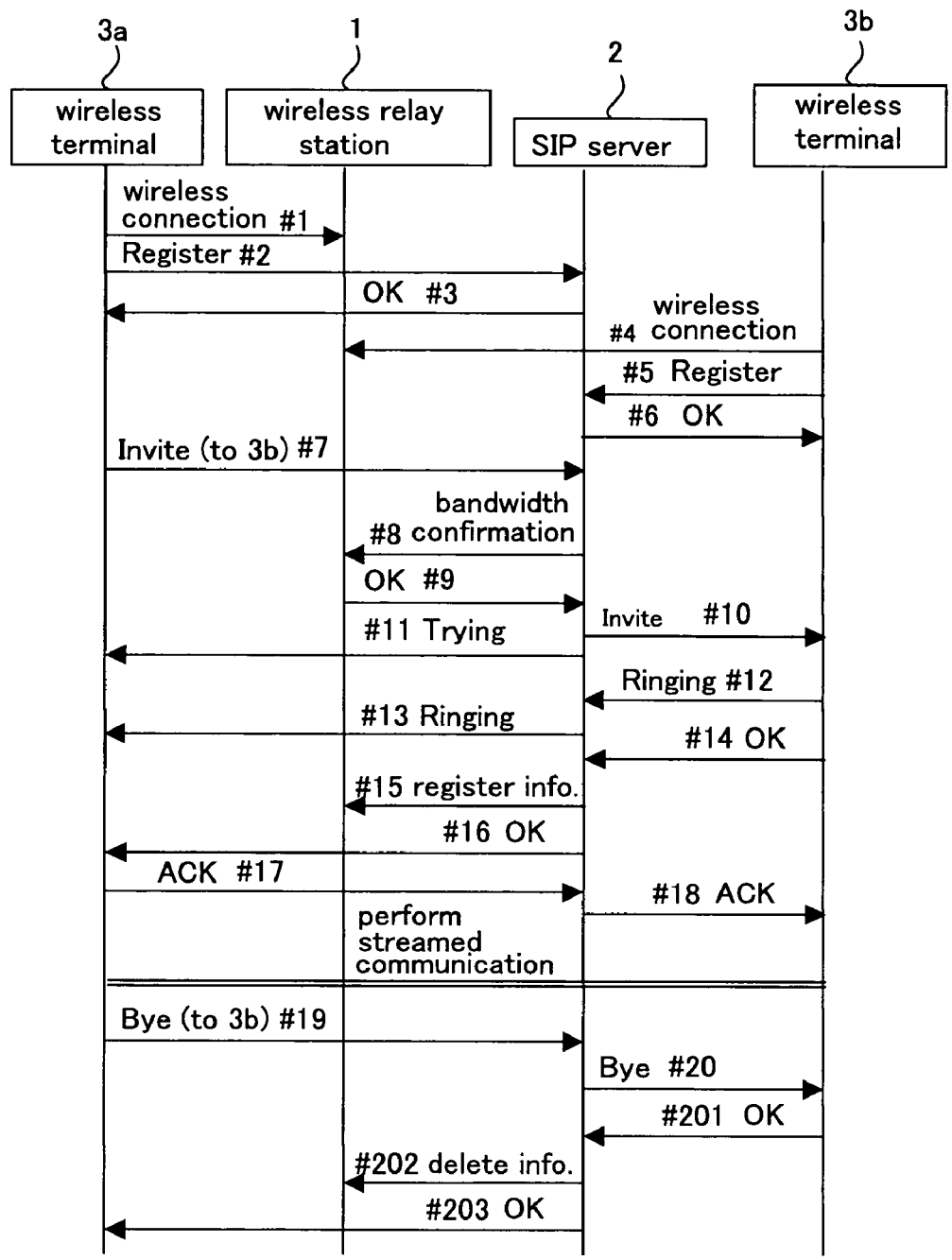
FIG. 4 is a diagram showing the process flow that is performed by the wireless LAN system shown in FIG. 2.

FIG. 4 is a diagram showing the process flow that is performed by the wireless LAN system shown in FIG. 2. In order to facilitate explanations, an example is given in which the plurality of wireless terminals 3a and 3b can be both connected to any same wireless relay station 1a.

When the wireless terminal 3a is started up, the wireless LAN interface 34a sends a message searching for a wireless relay station 1. The wireless relay station 1a, which is capable of wireless connection, responds to this. The wireless terminal 3a connects to the wireless relay station 1a that has responded (#1).

After that, the IP telephone application 31a of the wireless terminal 3a sends to the SIP server 2 a Register message with information about the wireless terminal 3a, such that the wireless terminal 3a functions as a VoIP terminal with respect to the SIP server 2 (#2). For example, the IP application 31a of the wireless terminal 3a sends to the SIP server 2 the IP address and the port number of the wireless terminal 3a, and the identifier for calling up the wireless terminal 3a (telephone number, user ID, SIP address or the like). In order to call up by IP telephone other terminals using this identifier, this information is registered in the SIP server 2. The SIP server 2 notifies the actual IP address and port number based on the identifier of the wireless terminals 3, when performing an actual call process. If this registration is successful, the SIP server 2 sends an OK message to the wireless terminal 3a (#3).

Similarly, the wireless terminal 3b performs the wireless connection to the wireless relay station 1a (#4), and the identifier for calling up the wireless terminal 3b is registered in the SIP server 2 (#5, #6).

The following is an explanation of an example in which the wireless terminal 3a initiates a VoIP call to the wireless terminal 3b, while the wireless terminals 3a and 3b are both IP-connected in this manner to the wireless relay station 1a.

The IP telephone application 31a of the wireless terminal 3a sends a dialing message (Invite) to the SIP server 2. Since the priority communication discrimination portion 32a does not recognize this communication to be a prioritized communication, it is judged to be a non-prioritized communication. The priority communication instruction portion 33a instructs the wireless LAN interface 34a to perform non-prioritized communication. The Invite message is transferred from the wireless LAN interface 15 of the wireless relay station 1a to the wired LAN interface 16, and is sent via the wired LAN 4 to the SIP server 2 (#7). The wired LAN interface 24 of the SIP server 2 receives the Invite message, and passes it on to the SIP protocol control portion 22. The SIP protocol control portion 22 interprets it to mean that there is a call from the wireless terminal 3a to the wireless terminal 3b.

Furthermore, the SIP server 2 queries the wireless relay station 1a whether resources for prioritized communication are available. In other words, it queries whether the priority table 111 of the wireless relay station 1a has enough capacity for registering a total of four communications, namely the respective communications between the wireless terminals 3a and 3b and the wireless relay station 1a. The two communication paths for sending and receiving that are necessary for one call can be registered in one entry, so that it is queried whether two entries are available to register four communication paths. This query (referred to below as "bandwidth confirmation message") is sent by the external link portion 23 via the wired LAN interface 24 (#8). This bandwidth confirmation message includes an identifier of the communication selected by the SIP server 2 as prioritized communication.

The stream server communication portion 17 of the wireless relay station 1a extracts the bandwidth confirmation message and queries the bandwidth control portion 11 about the availability of resources for prioritized communication. The bandwidth control portion 11 refers to the priority table 111, and if resources are available, writes the received communication identifier into the priority table 111. Furthermore, the bandwidth managing portion 11 sets the communication state to "not connected." Then, the SIP server 2 is notified that resources have been reserved, or that no resources were available. This message is sent from the stream server communication portion 17 to the external link portion 23 of the SIP server 2 (#9).

When the external link portion 23 of the SIP server 2 is notified that resources have been reserved, then this is notified to the SIP protocol control portion 22. Receiving this notification, the SIP protocol control portion 22 sends a connection request (Invite) to the wireless terminal 3b (#10). At the same time, the SIP protocol control portion 22 sends a Trying message to the wireless terminal 3a (#11). On the other hand, the SIP server 2 may also send an Invite message to the wireless terminal 3b even if resources for prioritized communication are not available. In this case, all or some of the communication between the wireless terminals 3a and 3b in the wireless zone is treated as non-prioritized communication. On the other hand, if it is not possible to handle all of the communication between the wireless terminals 3a and 3b in the wireless zone as prioritized communication, the SIP server 2 may also send a disconnection message to the wireless terminal 3a without establishing a connection between the wireless terminals 3a and 3b.

If resources for prioritized communication between the wireless terminals 3a and 3b are available, the wireless terminal 3b first sends a Ringing message to the SIP server 2. The Ringing message is relayed to the wireless terminal 3a (#13). Even though the Invite and the Ringing messages pass through the wireless relay station 1a, the communication between the SIP server 2 and the wireless terminals 3a and 3b is not prioritized communication. Therefore, the two messages are judged to be non-prioritized communication by the priority communication discrimination portion 14 of the wireless relay station 1a. The priority order instruction portion 13 sends the respective messages as non-prioritized communication to the wireless terminals 3a and 3b via the wireless LAN interface 15 (#10 to #13). It should be noted that in order to turn the communication between the SIP server 2 and the wireless relay station 1a into prioritized communication, it is possible to assign resources for prioritized communication to this communication. This method is explained below in the second embodiment.

When the user of the wireless terminal 3b responds to the Invite message, then an OK message is sent from the IP telephone application 31b of the wireless terminal 3b via the wireless relay station 1a to the SIP server 2 (#14).

At the SIP server 2, this response message is interpreted by the SIP protocol control portion 22. Based on the interpretation, the SIP protocol control portion 22 notifies the wireless relay station 1a via the external link portion 23 of the establishment of the connection. Obtaining this notification, the bandwidth control portion 11 changes the communication state of the corresponding entry in the priority table 111 to "communicating." Thus, all or a portion of the VoIP communication between the wireless terminals 3a and 3b becomes prioritized communication in the wireless zone (#15).

The SIP protocol control portion 22 sends a response message (OK) via the wired LAN interface 24 and through the wireless relay station 1a to the wireless terminal 3a (#16). The response message includes a message indicating whether the two (i.e. upstream and downstream) communications between the wireless terminal 3a and the wireless relay station 1a are, respectively, prioritized communications or not. The wireless communication discrimination portion 32a of the wireless terminal 3a stores the received response message. The wireless terminal 3a receiving this response message sends a response message (ACK) via the SIP server 2 to the wireless terminal 3b (#17, #18).

After this, the call between the wireless terminals 3a and 3b begins. The communicated VoIP packets are judged to be prioritized communication by the priority communication discrimination portions 32a and 32b of the wireless terminals 3a and 3b, and by the priority communication discrimination portion 14 of the wireless relay station 1a. Thus, the wireless LAN interfaces of the wireless terminals 3a, 3b and the wireless relay station 1a are instructed to perform prioritized communication.

In order to interrupt the VoIP communication, an interrupt message (Bye) is sent from one of the wireless terminals. In this example, a Bye message is sent from the wireless terminal 3a. When the IP telephone application 31a sends a Bye message, it is sent via the wireless relay station 1a to the SIP server 2 (#19).

The SIP protocol control portion 21 sends the Bye message via the wireless relay station 1a to the wireless terminal 3b on the other side (#20).

The IP telephone application 31b confirms the Bye message and responds via the wireless relay station 1b, whereupon the SIP protocol control portion 22 interprets this response (#201).

The SIP protocol control portion 22 notifies the termination of the prioritized communication via the external link portion 23 to the stream server communication portion 17 of the wireless relay station 1a. Receiving this notification, the bandwidth managing portion 11 of the wireless relay station 1a eliminates the entry for the corresponding prioritized communication from the priority table 111 (#202).

The SIP protocol control portion 22 further sends a response message via the wireless relay station 1a to the wireless terminal 3a, and terminates all communication with regard to the VoIP communication (#203).

With the above-described process, a prioritized communication is registered in the priority table 111 in response to a request from the SIP server 2. Consequently, if there is a change in which communication is prioritized, that is, if the method of the priority control is changed, then the algorithm of the SIP server 2 should be changed. That is to say, by integrating the priority table 111 in the wireless relay station of an existing wireless communication system and adding a stream server 2, such as a SIP server, it is possible to change the method of the priority control easily and flexibly. In this example, only VoIP is prioritized, so that IP data from the same wireless terminal 3 that is not data for VoIP communication is not prioritized. In other words, it is possible to relay only the communication with regard to specified applications, such as IP telephone applications for example, with higher priority. Moreover, since registration in the priority table is performed to an extent that does not exceed the resources for prioritized communication, it can be prevented that there is contention among prioritized communications, leading to a deterioration of communication quality.

Second Embodiment

In the first embodiment, an upper limit is provided for the number of prioritized communications registered in the priority table 111, thus restricting the registrations in the priority table 111. Another method is to judge whether resources for prioritized communication are available based on the bandwidth that the wireless terminals 3 consume by wireless communication (referred to as "consumption bandwidth" in the following).

Figure 5:
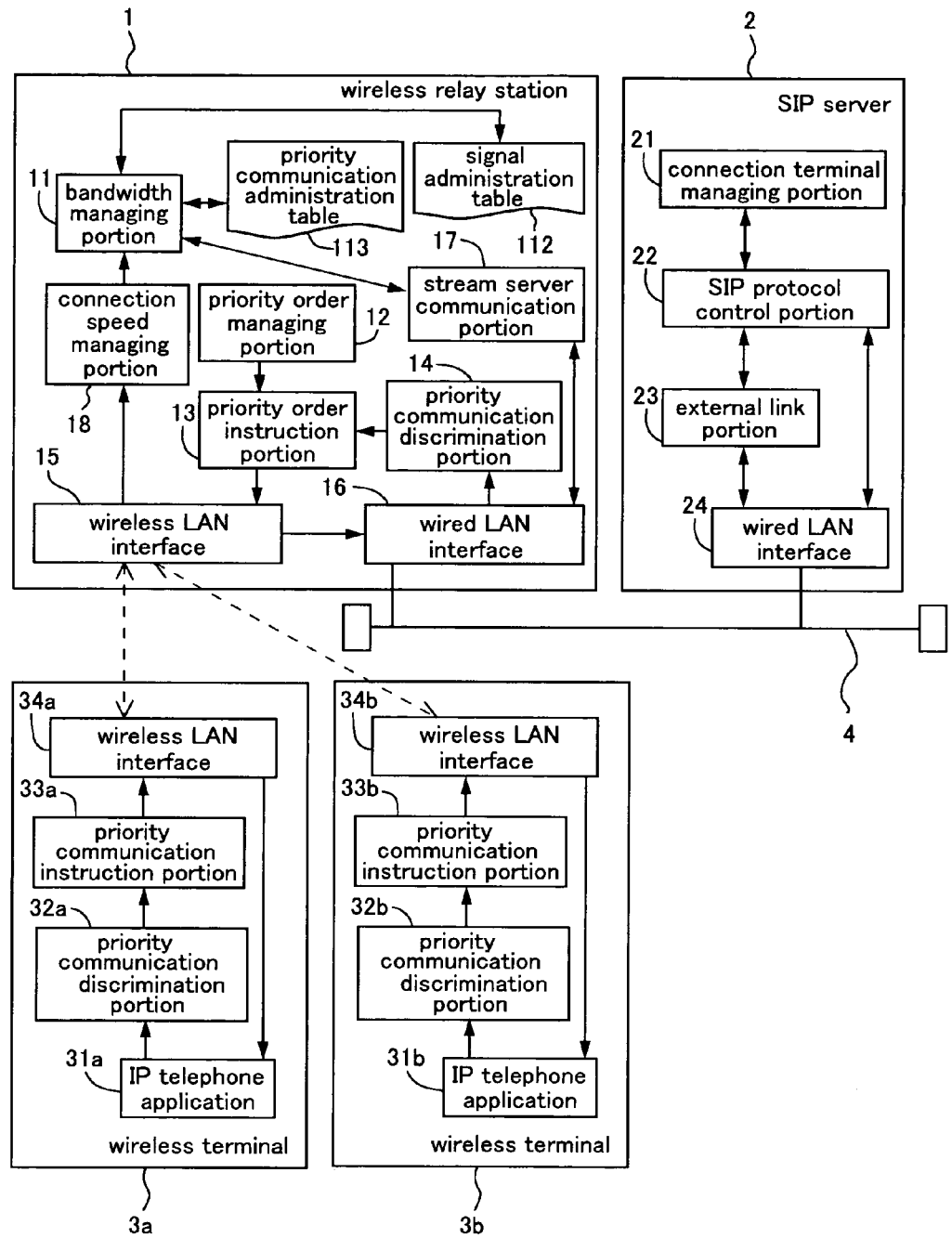
FIG. 5 shows the functional configuration of a wireless LAN system according to a second embodiment.

FIG. 5 shows the functional configuration of a wireless relay station 1, a SIP server 2 and wireless terminals 3 according to a second embodiment. Elements having the same function as in the first embodiment are denoted by the same reference numerals. Differences to the first embodiment are the fact that a signal administration table 112 is provided, as well as the information stored in the priority table 113.

FIG. 6 is a schematic illustration of the signal administration table 112. Registered in the signal administration table 112 are communication identifiers identifying the communication data communicated from the SIP server 2 to any of the communication terminals and the communication data communicated from any of the communication terminals to the SIP server 2. FIG. 6 shows the case that the IP address of the SIP server 2 is "192.168.1.5" and the port number of the SIP server 2 is "5060." The asterisk "*" in FIG. 6 represents an arbitrary sender or an arbitrary recipient. By providing the signal administration table 112 to assign resources for prioritized communication to the communication between the SIP server 2 and the wireless relay station 1, it is possible to let the wireless relay station 1 send IP communication control message exchanged between the SIP server 2 and the wireless relay station 1 with higher priority. Consequently, seen from the user of the wireless terminal 3, there is the effect that the standby time for calling another terminal is shortened, even when the wireless network is congested. The signal administration table 112 is managed and updated by the bandwidth managing portion 11 of the wireless terminal 3.

FIG. 7 is a schematic diagram of the priority table 113. In this priority table 113, communication identifiers, consumption bandwidths and communication states of prioritized communications are registered. The IP address and port number of the sender and the receiver are used for the communication identifiers. Whether a communication identifier is registered in the priority table 113 depends on whether the sum of the consumption bandwidth of the prioritized communications registered in the priority table 113 becomes lower than the resources for prioritized communication. "Consumption bandwidth" means the communication bandwidth used by the wireless terminals 3. It should be noted, however, that in wireless LANs the communication speed between the wireless terminal 3 and the wireless relay station 1 changes depending on the communication state, so that it is necessary to use a converted value, unless communication is performed at the maximum communication speed. Let us consider for example the case that the maximum communication speed is 11 Mbps, and a given wireless terminal 3 communicates for some reason at 5.5 Mbps. This communication at 5.5 Mbps necessitates twice the communication time for communication of the same amount of data than communication at 11 Mbps. This means that by communicating at 5.5 Mbps, twice the consumption bandwidth of communication at 11 Mbps is used. For example, if VoIP communication is carried out by G.711, then the consumption bandwidth at 11 Mbps is 128 kbps, but at 5.5 Mbps, it is managed as a consumption bandwidth of 256 kbps. The calculation of the consumption bandwidth is performed by the bandwidth managing portion 11 of the wireless relay station 1.

Whether a communication is registered in the priority table 113 is decided for example as follows. Let us consider the case that VoIP communication is relayed with higher priority in a wireless communication system in accordance with IEEE 802.11b. Let the available bandwidth of the wireless LAN shared by the wireless terminals 3 be 11 Mbps. Of those 11 Mbps, 6.5 Mbps are reserved as the communication bandwidth for VoIP communication, that is, as the resources for prioritized communication. The consumption bandwidth of the wireless terminals is converted, taking as a reference the case that the transfer data amount per unit time of the wireless terminals 3 is 11 Mbps, and written into the priority table 113. Then, new prioritized communications are registered in the priority table 113 to an extent that the sum of the consumption bandwidth of the wireless terminals 3 does not exceed 6.5 Mbps.

Except for the method of judging whether a communication is registered in the priority table 113 and the aspect that the signal administration table 112 is used, the wireless LAN system of this embodiment performs the same process as in the first embodiment. Consequently, if sufficient resources for prioritized communication are provided, then it is possible to control which communication the external SIP server 2 handles with priority, and to avoid contention among prioritized communications.

Third Embodiment

In the first and the second embodiment, it is possible to combine the priority table 111 or the priority table 113 and the signal administration table 112 to one table.

FIG. 8 shows an administration table in which the priority table 113 and the signal administration table 112 of the second embodiment have been combined. It is possible to perform the same processing as described above, when using the administration table shown in FIG. 8 instead of the priority table 111 shown in FIG. 1, or instead of the combination of the priority table 113 and the signal administration table 112 shown in FIG. 6. The communication bandwidth necessary for the signaling communication can be calculated based on the number of wireless terminals or the connection process frequency.

Fourth Embodiment (1) Configuration

The wireless relay station 1 to which a wireless terminal 3 is connected may change as the wireless terminals 3 moves. It is preferable that the prioritized communication performed with a given wireless relay station 1a can be continued seamlessly also with the wireless relay station 1b to which the wireless terminal 3 is moved. For this reason, the resources for prioritized communication may be divided into resources for existing parties and guest resources for moving parties. By reserving guest resources, it is possible to reserve resources for prioritized communication with wireless terminals 3 that are connected by moving.

Figure 9A:
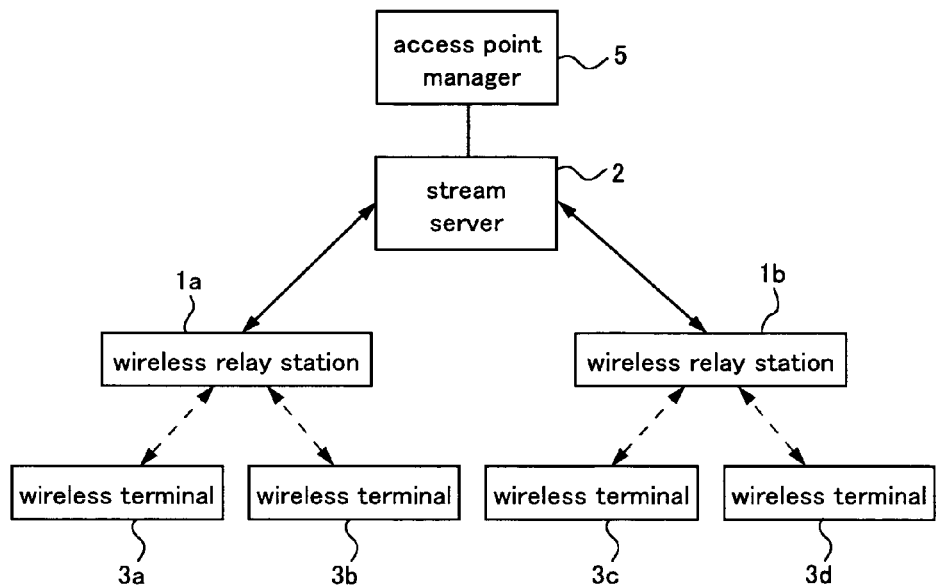
FIG. 9 is an overall structural diagram of a wireless communication system according to a fourth embodiment.
Figure 9B:
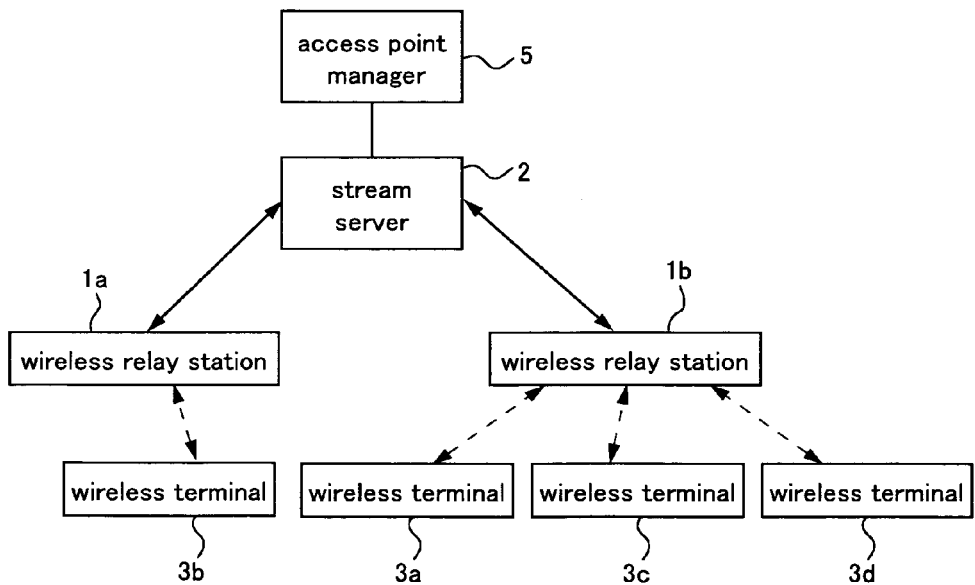

FIG. 9 is an overall structural diagram of a wireless communication system according to a fourth embodiment. Elements having the same function as in the first to third embodiments are denoted by the same reference numerals. In this embodiment, the wireless communication system includes a plurality of wireless relay stations, and furthermore an access point manager 5 (referred to as "AP manager" below). In order to simplify the explanations, the following is an example in which a wireless terminal 3a is moved from a region administrated by a wireless relay station 1a (see FIG. 9A) to a region administrated by a wireless relay station 1b (see FIG. 9B).

Figure 10:
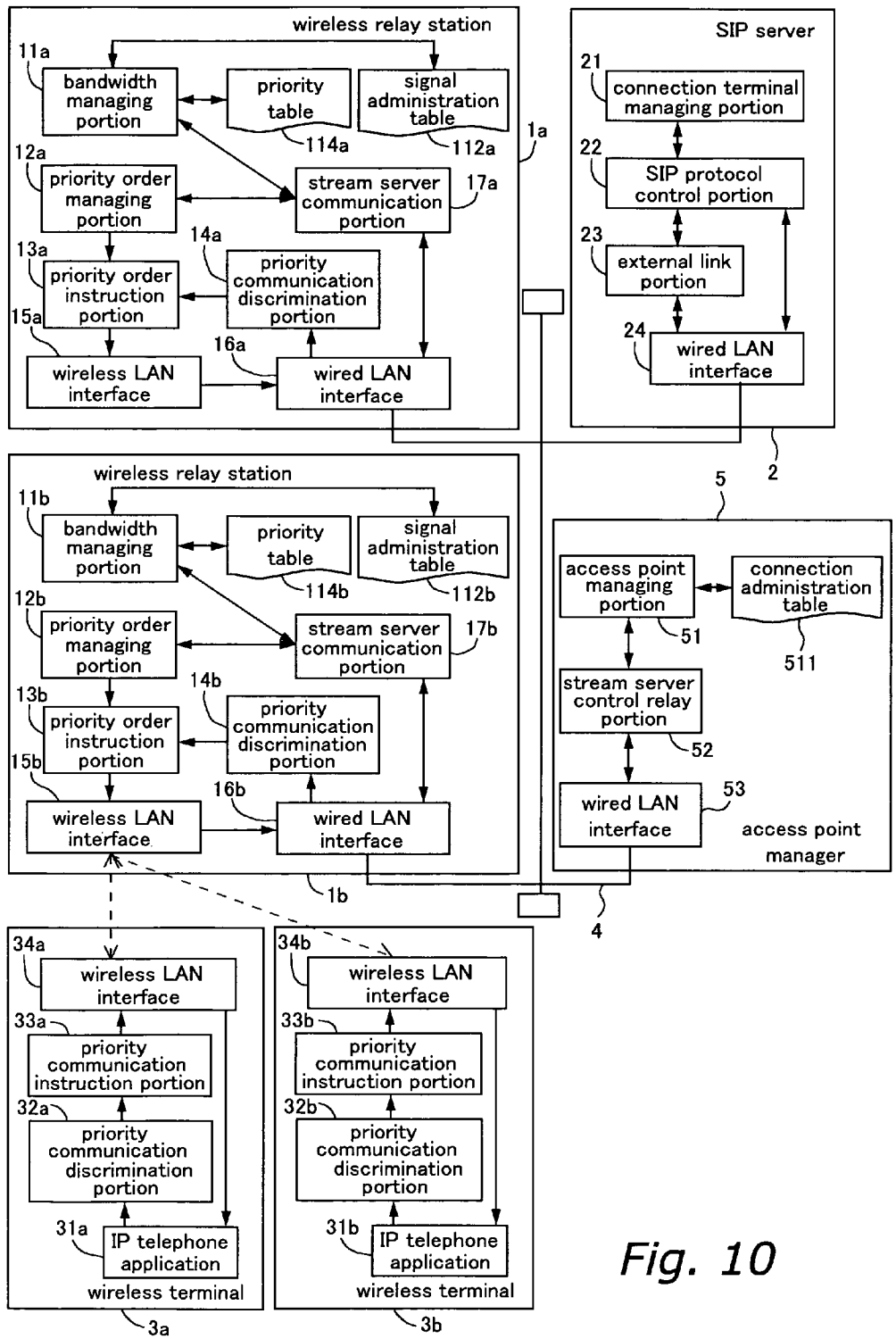
FIG. 10 is a functional diagram for the case that the wireless communication system shown in FIG. 9 is applied to a wireless LAN.

FIG. 10 is a functional diagram of each of the elements for the case that the wireless communication system shown in FIG. 9 is applied to a wireless LAN. In FIG. 10, the same functions as in Embodiment 1 to 3 are denoted by identical reference numerals. The wireless relay station 1b has the same functional configuration as the wireless relay station 1a. As above, an example is explained in which an SIP server 2 handling VoIP communication is used as the stream server 2, and VoIP communication is relayed with higher priority.

The AP manager 5 has the following structural elements.
(a) Access point managing portion 51: The access point managing portion 51 has a connection administration table 511, and manages the relation between the wireless terminals 3 and the wireless relay stations 1 based on this connection administration table 511.
(b) Stream server control relay portion 52: The stream server control relay portion 52 exchanges data with the SIP server 2.
(c) Wired LAN interface 53: The wired LAN interface 53 performs access control in accordance with the standard for wireless LANs.

FIG. 11 is a schematic diagram illustrating a priority table 114 having entries for existing parties and entries for guests. The sum of entries for existing parties and entries for guests is controlled such that the upper limit for the maximum number of connections determined by the method described in the first embodiment is not exceeded. The ratio between the two is adjusted as appropriate in accordance with the location at which the wireless relay stations 1 are set up. Moreover, the ratio between the two does not always have to be constant and may also be changed in accordance with the number of wireless terminals that are used while moving. Prioritized communications of wireless terminals 3 connected for at least a predetermined time T to the wireless relay station 1 having this table are registered in the entries for the existing parties. Prioritized communications of wireless terminals 3 that have moved from a region administrated by another wireless relay station 1 are registered in the entries for guests. The prioritized communications registered in the entries for guests are moved to the entries for existing parties when a predetermined time T has passed after their registration.

The communication identifier for the prioritized communication of a guest entry is sent from another wireless relay station 1. That is to say, as the wireless terminal 3 moves, the communication identifier listed in the priority table 114a of the wireless relay station 1a at the original location is sent to the priority table 114b of the wireless relay station 1b at the destination location. Then, the prioritized communication performed by this wireless terminal 3 is newly registered in the guest entries of the priority table 114b at the destination location, and deleted from the entries for existing terminals of the priority table 114a at the original location. As the wireless terminal 3 moves, the priority table 114 of the associated wireless relay stations 1 is updated, so that the wireless terminal 3 can seamlessly perform prioritized communication.

Moreover, the wireless relay stations 1 can effectively use resources for prioritized communication that have become unnecessary.

It should be noted that in this example, an upper limit is set for the number of entries, that is, the number of connections, restricting registrations in the priority table 114, but it is of course also possible to restrict registrations by monitoring the consumption bandwidth, as described above (see second embodiment above). Moreover, it is also possible to further integrate the signal administration table 112 into the priority table 114, as shown in the third embodiment.

FIG. 12 is a schematic diagram illustrating a connection administration table 511. This table oversees which wireless terminal 3 is connected to which wireless relay station 1. More specifically, this table stores the IP addresses of the wireless terminals 3 and the IP addresses of the wireless relay stations 1 to which those wireless terminals 3 are connected. Based on this, it is possible to query a wireless relay station 1 to which the wireless terminals 3 are connected whether resources for prioritized communication are available.

(2) Processing

Figure 13:
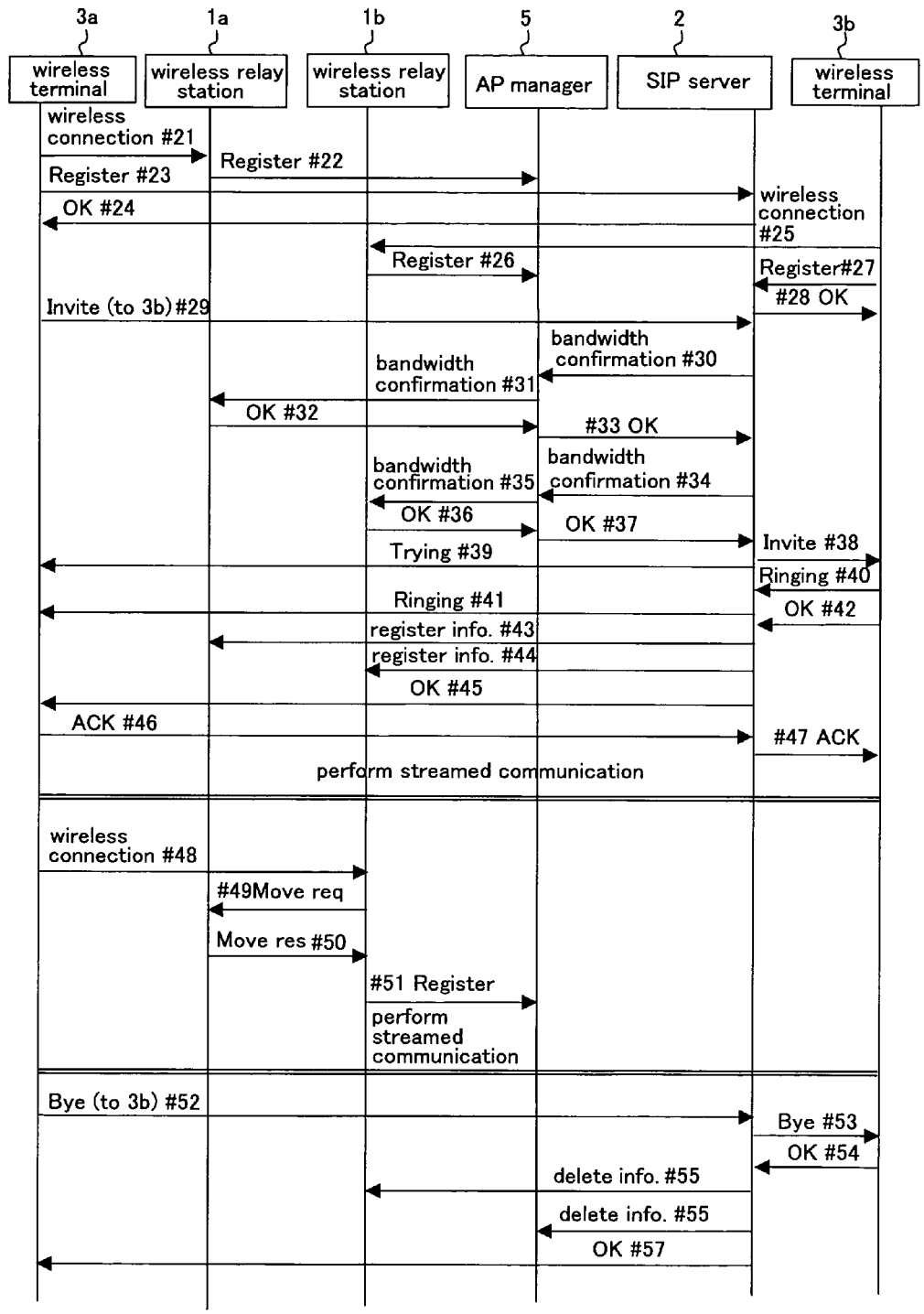
FIG. 13 is a diagram showing the process flow in the wireless LAN system shown in FIG. 10.

FIG. 13 is a diagram showing the process flow in the wireless LAN system shown in FIG. 10.

When the wireless terminal 3*a* is started up, the wireless LAN interface 34*a* sends a message searching for a wireless relay station 1. The wireless relay station 1*a*, which is capable of connecting to the wireless terminal 3*a*, responds to this. The wireless terminal 3*a* connects to the wireless relay station 1*a* that has responded (#21).

The wireless relay station 1*a* sends information about the wireless terminal 3*a* and the wireless relay station 1*a* to the AP manager 5 (#22). The stream server control relay portion 52 of the AP manager 5 receives this information, and passes it on to the access point managing portion 51. Thus, the association of the wireless terminal 3*a* and the wireless relay station 1*a* is registered in the connection administration table 511. It should be noted that in this example, there is no particular limitation to the timing at which the relation between the wireless terminals 3 and the wireless relay stations is registered. For example, it is possible that the wireless relay station 1 registers this information in the AP manager 5 at the stage when the wireless terminal 3 is wirelessly connected, at the stage when the wireless terminal 3 sends the Register message to the SIP server 2, or at the stage when the wireless terminal 3 sends the Invite message to the SIP server 2.

After that, information of the wireless terminal 3*a* is sent from the wireless terminal 3*a* to the SIP server 2, such that the wireless terminal 3*a* functions as a VoIP terminal with respect to the SIP server 2 (#23). For example, the IP telephone application 31*a* of the wireless terminal 3*a* registers the IP address and port number of the wireless terminal 3*a*, and an identifier (telephone number, user ID, SIP address or the like) for calling up the wireless terminal 3*a*. When this registration is successful, the SIP server 2 sends an OK message to the wireless terminal 3*a* (#24).

The wireless terminal 3*b* connects to the wireless relay station 1*b* (#25), is registered in the AP manager 5 (#26) and registered in the SIP server 2 (#27, #28) in the same manner as the wireless terminal 3*a*.

The following is an explanation of an example in which the wireless terminal 3*a* initiates a VoIP call to the wireless terminal 3*b*, while the wireless terminals 3*a* and 3*b* are both IP-connected in this manner to the wireless relay station 1*a*.

The IP telephone application 31*a* of the wireless terminal 3*a* sends an Invite message to the SIP server 2 (#29). Since the priority communication discrimination portion 32*a* does not recognize this communication to be a prioritized communication, it is judged to be a non-prioritized communication. The priority communication instruction portion 33*a* instructs the wireless LAN interface 34*a* to perform non-prioritized communication. The Invite message is transferred from the wireless LAN interface 15*a* of the wireless relay station la to the wired LAN interface 16*a*, and is sent via the wired LAN 4 to the SIP server 2. The wired LAN interface 24 of the SIP server 2 receives the Invite message, and passes it on to the SIP protocol control portion 22. The SIP protocol control portion 22 interprets it to mean that there is a call from the wireless terminal 3*a* to the wireless terminal 3*b*.

Furthermore, the SIP server 2 queries the AP manager 5 whether resources for prioritized communication are available (#30).

The AP manager 5 looks up the communication administration table 511, and performs a bandwidth confirmation with the wireless relay station 1*a* connected to the wireless terminal 3*a* (#31).

At the wireless relay station 1*a*, the stream server communication portion 17*a* extracts the bandwidth confirmation message and queries the bandwidth control portion 11*a* about the availability of resources for prioritized communication. The bandwidth control portion 11*a* refers to the priority table 114*a*, and if resources are available, writes the received communication identifier into the priority table 114*a*. Furthermore, the bandwidth managing portion 11*a* sets the communication state to "not connected." If there is bandwidth available at the wireless relay station 1*a*, then an OK message is sent back from the stream server communication portion 17*a* of the wireless relay station 1*a* to the AP manager 5 (#32). The AP manager 5 returns this OK message to the external link portion 23 of the SIP server 2 (#33). The bandwidth confirmation message includes an identifier of the communication selected by the SIP server 2 as prioritized communication.

Similarly, the SIP server 2 queries the wireless relay station 1*b* via the AP manager 5 whether resources are available for the wireless communication between the wireless terminal 3*b* and the wireless relay station 1*b*, and receives the response to this (#34 to #37).

When notified that resources have been reserved, the external link portion 23 of the SIP server 2 notifies this to the SIP protocol control portion 22. Receiving this, the SIP protocol control portion 22 sends an Invite message to the wireless terminal 3*b* (#38). Similarly, the SIP protocol control portion 22 sends a Trying message to the wireless terminal 3*a* (#39). If there are no resources for prioritized communication available in either one or both of the wireless relay stations 1*a* and 1*b*, then the SIP server 2 may also send an Invite message to the wireless terminal 3*b*. In this case, all or some of the communication between the wireless terminals 3*a* and 3*b* in the wireless zone is treated as non-prioritized communication. On the other hand, if it is not possible to handle all of the communication between the wireless terminals 3*a* and 3*b* in the wireless zone as prioritized communication, the SIP server 2 may also send a disconnection message to the wireless terminal 3*a* without establishing a connection between the wireless terminals 3*a* and 3*b*.

If a connection is established between the wireless terminals 3*a* and 3*b*, the wireless terminal 3*b* first sends a Ringing message to the SIP server 2 (#40). The Ringing message is relayed to the wireless terminal 3*a* (#41). As mentioned above, it is preferable to assign resources for prioritized communication to the communication data exchanged by the SIP server 2, such as Invite messages and Ringing messages.

When the user of the wireless terminal 3b responds to the Invite message, then an OK message is sent from the IP telephone application 31b of the wireless terminal 3b via the wireless relay station 1a to the SIP server 2 (#42).

At the SIP server 2, this response message is interpreted by the SIP protocol control portion 22. Based on the interpretation, the SIP protocol control portion 22 notifies the wireless relay stations 1a and 1b via the external link portion 23 that a connection has been established (#43, #44). Receiving this notification, the bandwidth control portions 11a and 11b change the communication state of the corresponding entries in the priority tables 114a and 114b to "communicating." Thus, all or a portion of the VoIP communication between the wireless terminals 3a and 3b becomes prioritized communication in the wireless zone.

The SIP protocol control portion 22 of the SIP server 2 further sends a response message (OK) via the wired LAN interface 24 and through the wireless relay station 1a to the wireless terminal 3a (#45). The response message includes a message indicating whether the two (i.e. upstream and downstream) communications between the wireless terminal 3a and the wireless relay station 1a are prioritized communications or not.

The wireless terminal 3a sends a response message (ACK) via the SIP server 2 to the wireless terminal 3b (#46, #47). The response message includes a message indicating whether the two (i.e. upstream and downstream) communications between the wireless terminal 3b and the wireless relay station 1b are prioritized communications or not. Having received these response messages, the wireless communication discrimination portions 32a and 32b of the wireless terminals 3a and 3b store these response messages.

After this, the call between the wireless terminals 3a and 3b begins. The communicated VoIP packets are judged to be prioritized communication by the priority communication discrimination portions 32a and 32b of the wireless terminals 3a and 3b, and by the priority communication discrimination portions 14a and 14b of the wireless relay stations 1a and 1b. Thus, the wireless LAN interfaces of the wireless terminals 3a, 3b and the wireless relay station 1a are instructed to perform prioritized communication.

When the wireless terminal 3a moves from the region administrated by the wireless relay station 1a to the region administrated by the wireless relay station 1b, the wireless terminal 3a sends a message searching for a wireless relay station 1. The wireless relay station 1b, which is capable of connection, responds to this message. The wireless terminal 3a then connects to the wireless relay station 1b, which has responded (#48).

The stream server communication portion 17b of the wireless relay station 1b requests from the stream server communication portion 17a of the wireless relay station 1a the transfer of information relating to the wireless terminal 3a (#49). In this situation, the wireless relay station 1a from which this information has been requested confirms that guest resources are left over, and if there is no problem, responds to the transfer request (#50). Moreover, since the correlation between the wireless terminal 3 and the wireless relay station 1 has changed, the wireless relay station 1b notifies the AP manager 5 of the new correlation (#51).

The wireless relay station 1a, which has received the Move message, sends the information registered in the entries of the prioritized communication regarding the wireless terminal 3a to the wireless relay station 1b, for the originator of the request (#50). After this, the bandwidth managing portion 11a of the wireless relay station 1a eliminates the information registered in the entries of the prioritized communication related to the wireless terminal 3a from the priority table 114b. On the other hand, the bandwidth managing portion 11b of the wireless relay station 1b registers the information about the prioritized communication regarding the wireless terminal 3a in the guest entries of the priority table 114b. Moreover, the bandwidth managing portion 11b monitors whether a predetermined time T has passed since the registration, and after the predetermined time T has passed, moves the information registered in the guest entries to the entries for existing parties.

The wireless relay station 1b notifies the AP manager 5 that the wireless terminal 3b is connected (#51). This notification includes the IP address of the wireless terminal 3b. The AP manager 5 updates the connection administration table 511 based on this notification.

After this, prioritized communication via the wireless relay station 1b continues.

In order to interrupt the VoIP communication, a Bye message is sent from one of the wireless terminals. In this example, a Bye message is sent from the wireless terminal 3a. When the IP telephone application 31a sends a Bye message, it is sent via the wireless relay station 1b to the SIP server 2 (#52).

The SIP protocol control portion 21 sends the Bye message via the wireless relay station 1b to the wireless terminal 3b, which is the other terminal (#53).

The IP telephone application 31b confirms the Bye message and responds via the wireless relay station 1b, whereupon the SIP protocol control portion 22 interprets this response (#54).

The SIP protocol control portion 22 notifies the termination of the prioritized communication via the external link portion 23 to the stream server communication portion 17b of the wireless relay station 1b. Receiving this notification, the bandwidth managing portion 11b of the wireless relay station 1b eliminates the entry for the corresponding prioritized communication from the priority table 114b (#55).

The SIP protocol control portion 22 further requests from the AP manager 5 the elimination of the information relating to the wireless terminals 3a and 3b (#56). Receiving this request, the AP manager 5 eliminates the entries with information relating to the wireless terminals 3a and 3b from the connection administration table 511.

The SIP protocol control portion 22 further sends a response message via the wireless relay station 1b to the wireless terminal 3a, and ends all communications relating to the VoIP communication (#57).

With this process, even when the wireless terminal 3 moves and the connected wireless relay station changes, prioritized communication that was performed before the move can be continued after the move. Moreover, resources that have become unnecessary can be assigned by the wireless relay stations to other prioritized communications, thus allowing efficient use of the resources for prioritized communication.

Fifth Embodiment

Figure 14:
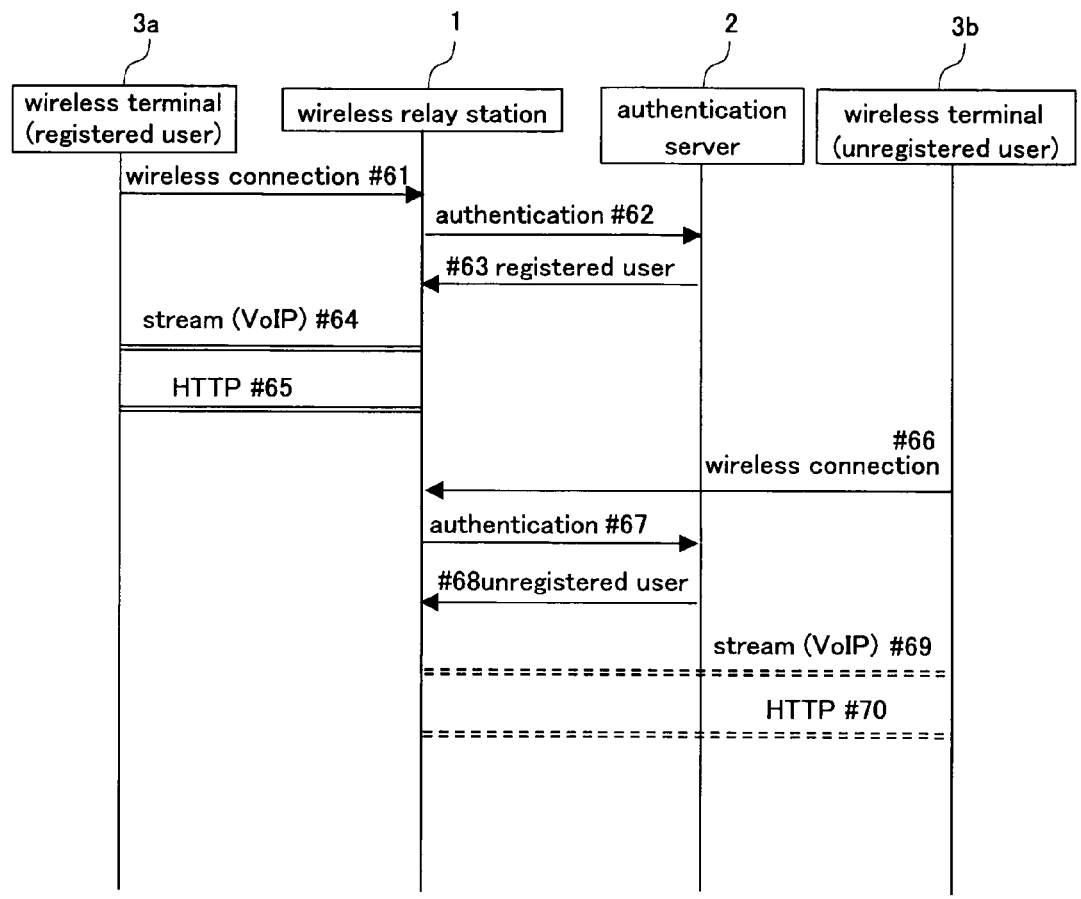
FIG. 14 is a diagram showing the process flow in the wireless LAN system according to a fifth embodiment.

The first to fourth embodiments were explained for the case that a SIP server is used as the stream server 2. In the fifth embodiment, a user authentication server is used instead of the stream server 2. The user authentication server 2 performs user authentication, for example for connecting wireless terminals 3 to the internet, and stores registered users. This is explained with reference to FIG. 14: When there is a connection request from the wireless terminal 3a of a registered user (#61), the authentication server 2 requests from the wireless relay station 1 a registration to the effect that communication by the wireless terminal 3a is performed as prioritized communication, regardless of the application type (#62, #63), whereas with regard to the connection request from the wireless terminal 3b of an unregistered user, the authentication server 2 may notify the wireless relay station 1 that prioritized communication is not necessary, regardless of the application type (#66 to #68). Thus, communication between the wireless terminal 3a and the wireless relay station 1, for example, is prioritized regardless of the application type, such as VoIP communication or HTTP communication (#64, #65). Conversely, communication between the wireless terminal 3b and the wireless relay station 1 is handled as non-prioritized communication regardless of the application type (#69, #70). Alternatively, the authentication server 2 may request the wireless relay station 1 to handle all communication, such as VoIP communication or HTTP communication, regarding connection requests from registered users as prioritized communication, and to handle only HTTP communication regarding connection requests of unregistered users as prioritized communication.

Other Embodiments (A) In the above-described first to fourth embodiments, in response to a query about the availability of resources for prioritized communication from the SIP server 2, the wireless relay station 1 sends back a reply indicating whether resources are available. However, by changing the data type, it is sometimes possible to perform prioritized communication with little resources. For example, in VoIP communication, it is possible to change, for example, the type of the audio data that are communicated, depending on the capability of the communicating wireless terminals or the available bandwidth or the like. More specifically, in VoIP calls, audio data of the G.711 standard in which the transfer speed of the audio data is 64 kbps are often used. On the other hand, there are several standards such as the G.722 standard (8 kbps), in which audio compression is performed. Accordingly, the wireless relay station may respond: "The bandwidth for G.711 cannot be secured, but the resources for G.722 are available."

Moreover, if there is a request from the wireless terminal 3 to connect by video and audio, then the wireless relay station 1 may respond that the resources are available for a connection by audio only. Under the SIP, also information what is used as the media is specified in the signal. Using this information, it is possible to realize prioritized communication within a scope that can be afforded by the resources for prioritized communication by changing the media connected to the SIP server 2 in accordance with the response from the wireless relay station 1 and notifying the other party.

Figure 15:
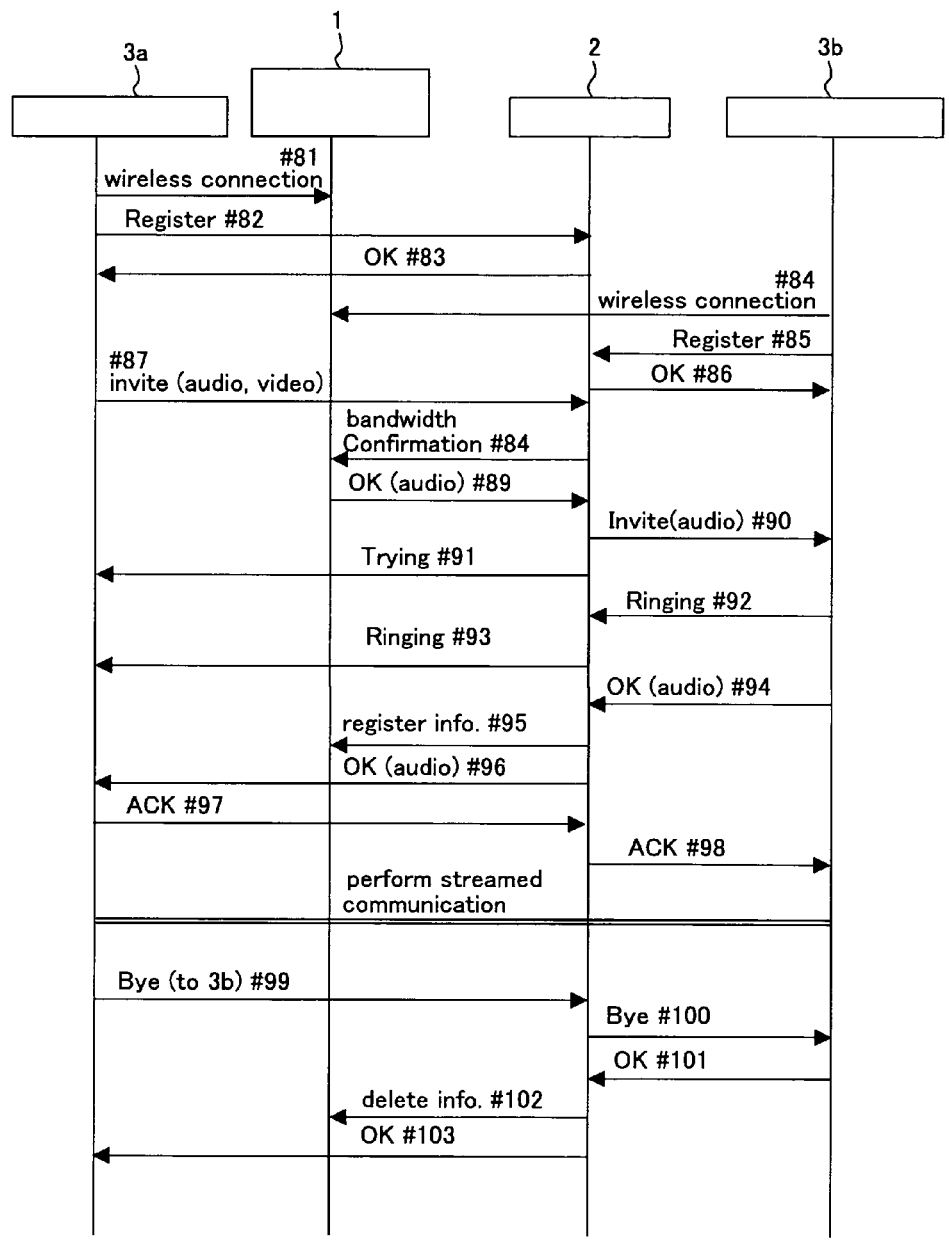
FIG. 15 is a diagram showing the process flow in the wireless LAN system according to another embodiment.

FIG. 15 shows an example of the process flow for this case. After the wireless terminals 3a and 3b have wirelessly connected to the wireless relay station 1 (#81, #84) and registered (#82, #83, #85, #86), the wireless terminal 3a requests the communication of audio and video from the wireless relay station 1 (#87). The SIP server 2 sends a bandwidth confirmation message to the wireless relay station 1 regarding the bandwidth for audio and video communication (#88). Assuming that prioritized communication is possible in the case of audio communication only, the wireless relay station 1 sends back its OK for audio communication (#89). This is also notified to the wireless terminal 3b (#90). At the same time, the wireless relay station 1 returns a Trying message to the wireless terminal 3a (#91). After this, the wireless terminal 3b sends a Ringing message via the SIP server 2 to the wireless terminal 3a (#92, #93). The SIP server 2 waits for the OK from the wireless terminal 3b, and registers in the wireless relay station 1 the prioritized communication for audio (#95). After the fact that the audio communication is prioritized communication has been notified to the wireless terminal 3a (#96), the wireless terminal 3a sends back an ACK message via the SIP server 2 to the wireless terminal 3b (#97, #98), and the communication begins. The communication is terminated in a similar manner as explained above (#99 to #103).

(B) The scope of the present invention also includes programs executing the above-described methods and computer-readable recording media storing such programs. Examples of such recording media include computer-readable flexible disks, hard disks, semiconductor memories, CD-ROMs, DVDs, and magneto-optical disks (MOs) among others.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A communication relay method executed by a wireless communication system comprising a plurality of wireless terminals, a relay device connected by a wireless network to the wireless terminals, and a communication managing device connected to the relay device by a wired network, the method comprising:
  storing, in the relay device, a priority table in which identifiers of communications relayed with higher priority are registered;
  relaying, by the relay device, communication specified by the communication identifiers stored in the priority table with higher priority than other communication;
  receiving, by the communication managing device, communication start requests from any of the wireless terminals and sending communication identifiers specifying the communications that are about to be started to the relay device;
  receiving, by the relay device, the communication identifiers and registering the received communication identifiers in the priority table, to an extent that a proportion S/U of a sum S of consumption bandwidths of the communications specified by the communication identifiers registered in the priority table to the available bandwidth U of the wireless network does not exceed a predetermined upper limit.

2. The communication relay method according to claim 1, wherein the relay device registers communication identifiers in the priority table to an extent that the number of communications specified by the communication identifiers registered in the priority table is not greater than a predetermined number of connections.

3. The communication relay method according to claim 1, wherein the relay device registers communication identifiers in the priority table to an extent that the sum of the consumption bandwidths of the communications specified by the communication identifiers registered in the priority table is not greater than an available bandwidth of the wireless network.

4. The communication relay method according to claim 1, wherein the relay device reserves, in the priority table, entries for guests in order to take over a relay of prioritized communication data that has been relayed by another relay device.

5. The communication relay method according to claim 4, wherein the relay device exchanges with another relay device communication identifiers specifying communication data relayed with higher priority, and updates the priority table based on a result of this exchange.

6. A communication relay system comprising:
a relay device connected by a wireless network to a plurality of wireless terminals; and
a communication managing device connected by a wired network to the relay device;
wherein the relay device comprises:
a priority table storing, from among a plurality of communications by wireless terminals, identifiers of those communications that are relayed with higher priority;
a relay means for relaying communication specified by the communication identifiers stored in the priority table with higher priority than other communication; and
a table managing means for receiving communication identifiers from the communication managing device, and registering received communication identifiers in the priority table, to an extent that a proportion S/U of a sum S of consumption bandwidths of the communications specified by the communication identifiers registered in the priority table to the available bandwidth U of the wireless network does not exceed a predetermined upper limit;
wherein the communication managing device receives communication start requests from any of the wireless terminals and sends to the relay device communication identifiers specifying the communication that are about to be started.

7. A relay device connected by a wireless network to a plurality of wireless terminals, the relay device comprising:
a connection means for connecting via a wired network to a communication managing device managing communication of the wireless terminals;
a storage means for storing a priority table in which identifiers of communications relayed with higher priority are registered;
a priority relay means for relaying communication data specified by the communication identifiers stored in the priority table with higher priority than other communication;
a request receiving means for receiving from the communication managing device requests to register a communication identifier in the priority table; and
a priority table updating means for registering the received communication identifiers in the priority table, to an extent that a proportion S/U of a sum S of consumption bandwidths of the communications specified by the communication identifiers registered in the priority table to the available bandwidth U of the wireless network does not exceed a predetermined upper limit.

8. A communication relay system comprising:
a relay device connected by a wireless network to a plurality of wireless terminals; and
a communication managing device connected by a wired network to the relay device;
wherein the relay device comprises:
a priority table storing, from among a plurality of communications by wireless terminals, identifiers of those communications that are relayed with higher priority;
an interface relaying communication specified by the communication identifiers stored in the priority table with higher priority than other communication; and
a managing portion receiving communication identifiers from the communication managing device, and registering received communication identifiers in the priority table, to an extent that a proportion S/U of a sum S of consumption bandwidths of the communications specified by the communication identifiers registered in the priority table to the available bandwidth U of the wireless network does not exceed a predetermined upper limit;
wherein the communication managing device receives communication start requests from any of the wireless terminals and sends to the relay device communication identifiers specifying the communication that are about to be started.

9. A relay device connected by a wireless network to a plurality of wireless terminals, the relay device comprising:
a first interface connecting via a wired network to a communication managing device managing communication of the wireless terminals;
a storage portion storing a priority table in which identifiers of communications relayed with higher priority are registered;
a second interface relaying communication data specified by the communication identifiers stored in the priority table with higher priority than other communication;
a managing portion receiving from the communication managing device requests to register a communication identifier in the priority table; and
a registering portion registering the received communication identifiers in the priority table, to an extent that a proportion S/U of a sum S of consumption bandwidths of the communications specified by the communication identifiers registered in the priority table to the available bandwidth U of the wireless network does not exceed a predetermined upper limit.

* * * * *